United States Patent

Keene

[15] 3,675,432
[45] July 11, 1972

[54] PIPELINE CONSTRUCTION

[72] Inventor: William A. Keene, Bartlesville, Okla.
[73] Assignee: Phillips Petroleum Company
[22] Filed: Feb. 28, 1971
[21] Appl. No.: 110,451

[52] U.S. Cl. .......................................... 61/72.1, 138/105
[51] Int. Cl. ...................................................... F16l 1/00
[58] Field of Search .................. 61/72.1, 72.2, 72.5, 72.6, 61/72.7; 138/105; 52/169, 743, 404; 138/106

[56] References Cited

UNITED STATES PATENTS

| 2,901,775 | 9/1959 | Goff | 138/105 X |
| 2,007,969 | 7/1935 | Grodsky | 61/72.1 |
| 2,360,067 | 10/1945 | McLeish | 138/105 |

Primary Examiner—Jacob Shapiro
Attorney—Young and Quigg

[57] ABSTRACT

In order to insulate a pipeline from the earth in which it is buried, the pipe is surrounded by a mass of dry earth, sand and/or gravel and a water-impermeable membrane.

10 Claims, 3 Drawing Figures

PIPELINE CONSTRUCTION

Considerable difficulty is often encountered in constructing pipelines which are to convey fluids at temperatures appreciably different from the temperature of the earth in which the pipeline is buried. This is particularly true when a pipeline is to be buried in regions of permafrost. In order to pump crude oil through pipelines in arctic regions, it is necessary to heat the oil so that the viscosity is sufficiently low to permit the oil to be pumped. Unless the pipeline is well insulated, excessive heat loss will occur. In addition to increasing the viscosity of the oil, the heat loss may tend to melt the surrounding permafrost, which can cause a shifting and possible rupture of the pipeline. While various types of insulating materials are known, the costs of most such materials are usually quite high for extensive pipeline use. In accordance with this invention, a low cost method is provided for constructing pipelines which are adapted to be used in transporting materials at temperatures different from the temperature of the surrounding earth formation. This is accomplished by first digging a trench into which the pipeline is to be buried. The trench is lined with a water-impermeable membrane, such as a sheet of heavy thermoplastic material. The trench is then filled with dry earth, sand and/or gravel and the pipeline is buried in the fill material. The water-impermeable liner is sealed over the top of the filled trench to prevent water from permeating the dry fill material. The dry earth, sand and/or gravel employed to fill the trench can advantageously be obtained by drying the material initially removed from the trench.

IN THE ACCOMPANYING DRAWING

Figure 1:
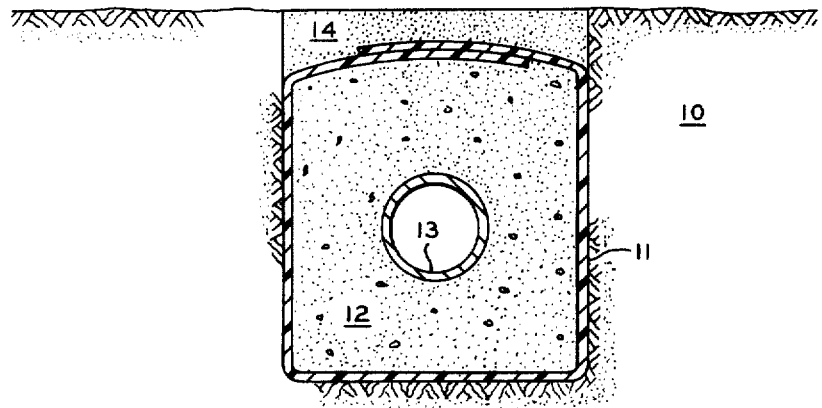
FIG. 1 is a schematic cross-sectional view of a pipeline constructed in accordance with this invention.

Referring now to the drawing in detail and to FIG. 1 in particular, there is shown a cross-section of earth 10 which contains permafrost. The first step of the method of this invention involves digging a trench in the earth along the route of the pipeline. A water-impermeable liner 11 is then positioned in the trench so as to extend longitudinally along the trench. This liner can advantageously be formed of a flexible sheet of heavy gage thermoplastic material, such as polyethylene. However, other types of water-impermeable material can be employed, such as asphalt impregnated woven or nonwoven sheet materials, for example. A multi-layer sheet may be advantageous in certain operations. The lined trench is then filled with dry earth, sand and/or gravel to support a pipe 13 in the central region of the trench. In this operation, the trench can be filled approximately half full with the dry material, and the pipe can then be positioned in the trench. The remainder of the trench is then filled with additional dry material to enclose the pipe. The edges of liner 11 are sealed together across the top of the filled trench. This can be accomplished by a heat sealing step or by the use of a suitable adhesive, depending on the nature of the material used as the liner. A fill material 14 can then be disposed over the top of the liner to prevent the liner from subsequently being damaged.

The dry earth, sand and/or gravel utilized to fill the trench can be obtained by heating the material initially removed from the trench to remove moisture contained therein. This can be accomplished by the use of a portable kiln which can be moved along as the pipeline is being constructed. If the material initially removed from the trench contains any appreciable amount of organic material, the heating step can include the introduction of air and the use of sufficiently high temperatures to burn this organic material. The resulting dried material which is returned to the trench provides an efficient heat insulator, and liner 11 prevents subsequent moisture invasion. If the earth formation contains an appreciable amount of water, it may be necessary to utilize additional fill obtained from another location to replace the lost volume of the water.

Figure 2:
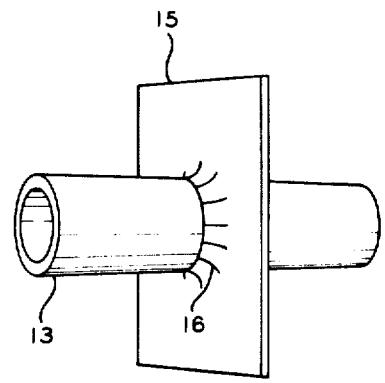
FIG. 2 illustrates a water-impermeable barrier which can be secured to the pipe at spaced locations.

It is desirable to provide vertical water-impermeable barriers at spaced locations along the pipe so that a series of individual compartments are formed. This confines water invasion in the event that a section of liner 11 is ruptured. The vertical barriers can be formed by the use of sheets of film 15 which are secured to pipe 13 at spaced locations. As illustrated in FIG. 2, such a membrane 15 is provided with a central opening which can contain a collar 16 which is secured to the pipe by the use of an adhesive or by fusing the plastic to the pipe. Sheet 15 is of sufficient size to extend across the cross-section of the trench. The edges of sheet 15 are fastened to liner 11 in fluid-tight engagement.

Figure 3:
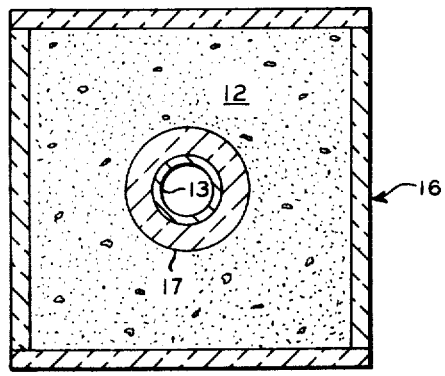
FIG. 3 is a schematic illustration of a second embodiment of a pipeline constructed in accordance with this invention.

If desired, additional insulating material can be employed in constructing the pipeline of this invention. As illustrated in FIG. 3, an outer layer of conventional heat insulating material 16, such as polyurethane foam, for example, can line the trench, and pipe 13 can be surrounded by a sheath of heat insulating material 17. If the insulating material selected for this purpose is water-impermeable, line 11 is not required. Otherwise, the liner can be employed in the same manner as illustrated in FIG. 1.

While this invention has been described in conjunction with the construction of oil pipelines in permafrost, the invention is applicable to any type of pipeline wherein the temperature of the fluid being transported differs substantially from the temperature of the surrounding earth formation. Such a pipeline can be employed to convey high temperature materials, such as molten sulfur, or low temperature materials, such as liquefied natural gas, for example. The dry earth, sand and/or gravel provides a low cost, efficient insulator. The size of the trench will depend on the size of the pipeline and the temperature differences to be encountered. A trench some ten feet square in cross-section can be employed if an oil pipeline is to be constructed in permafrost, for example. When a pipeline is constructed in permafrost in accordance with this invention, the dry material also serves as a spread foundation for the pipe. This is particularly true when gravel is employed to enclose the pipe. Such a foundation is quite effective in areas of permafrost.

While the invention has been described in conjunction with presently preferred embodiments, it should be evident that it is not limited thereto.

What is claimed is:

1. The method of laying a pipeline which comprises excavating a trench to receive the pipe; lining the trench with a water-impermeable liner; drying a quantity of earth, sand and/or gravel to remove moisture therefrom; positioning pipe and the thus dried earth, sand and/or gravel within the lined trench so that the pipe extends longitudinally of the trench and is surrounded by the dry earth, sand and/or gravel; and sealing the edges of the liner to form a water-impermeable barrier around the pipe and dry earth, sand and/or gravel.

2. The method of claim 1 wherein the material removed during the excavation step is dried to form the dry material employed to surround the pipe in the trench.

3. The method of claim 2 wherein the material is dried at an elevated temperature in the presence of oxygen to burn organic material contained therein.

4. The method of claim 1, further comprising positioning a series of water-impermeable second barriers in the trench in spaced relationship with one another, each of said second barriers extending from the pipe to the surrounding liner; and sealing said second barriers to said pipe and the surrounding liner to form a series of water-impermeable compartments.

5. A pipeline comprising a pipe positioned in the earth; a mass of dry earth, sand and/or gravel free of organic material surrounding said pipe; and a water-impermeable membrane enclosing said pipe and surrounding dry earth, sand and/or gravel.

6. The pipeline os claim 5, further comprising a series of second water-impermeable membranes positioned in spaced relationship with one another, each of said second membranes being sealed to and extending between said pipe and said first-mentioned membrane.

7. The pipeline of claim 5, further comprising a sheath of heat insulating material surrounding said pipe and being positioned between said pipe and said dry earth, sand and/or gravel.

8. The pipeline of claim 5, further comprising a mass of heat insulating material positioned between said dry earth, sand and/or gravel and said membrane.

9. The method of claim 1 wherein the earth, sand and/or gravel is dried at an elevated temperature in the presence of oxygen to burn organic material contained therein.

10. The method of laying a pipeline which comprises excavating a trench to receive the pipe; lining the trench with a water-impermeable liner; positioning pipe and dry earth, sand and/or gravel which is free of organic material within the lined trench so that the pipe extends longitudinally of the trench and is surrounded by the earth, sand and/or gravel; and sealing the edges of the liner to form a water-impermeable barrier around the earth, sand and/or gravel.

* * * * *

UNITED STATES PATENT OFFICE

CERTIFICATE OF CORRECTION

Patent No. 3,675,432      William A. Keene      Dated: July 11, 1972

It is certified that error appears in the above-identified patent and that said Letters Patent are hereby corrected as shown below:

Cover page, first column, No. [22] should read as follows:

-- [22] Filed    Jan. 28, 1971 -- ;

Column 2, line 71, change "os" to -- of -- .

Signed and sealed this 26th day of December 1972.

(SEAL)
Attest:

EDWARD M. FLETCHER, JR.           ROBERT GOTTSCHALK
Attesting Officer                 Commissioner of Patents